US006273130B1

(12) United States Patent
Cossins

(10) Patent No.: US 6,273,130 B1
(45) Date of Patent: Aug. 14, 2001

(54) GAS REGULATOR/VALVE DEVICE

(75) Inventor: Jonathan Paul Cossins, Staines (GB)

(73) Assignee: Protector Technologies B.V., An Schiedam (NL)

( * ) Notice: Subject to any disclaimer, the term of this patent is extended or adjusted under 35 U.S.C. 154(b) by 0 days.

(21) Appl. No.: 09/508,495

(22) PCT Filed: Sep. 14, 1998

(86) PCT No.: PCT/GB98/02780

§ 371 Date: Mar. 10, 2000

§ 102(e) Date: Mar. 10, 2000

(87) PCT Pub. No.: WO99/13945

PCT Pub. Date: Mar. 25, 1999

(30) Foreign Application Priority Data

Sep. 15, 1997 (GB) .................................................. 9719604

(51) Int. Cl.[7] ..................................................... F16K 37/00

(52) U.S. Cl. ........................ 137/557; 137/505.25; 116/70

(58) Field of Search .............................. 137/557, 505.25; 116/70, 266, 268, 273; 222/39

(56) References Cited

U.S. PATENT DOCUMENTS 3,785,333 * 1/1974 Warncke et al. ................. 137/557 X
3,811,400 5/1974 Smilg .

FOREIGN PATENT DOCUMENTS 1082126 5/1960 (DK) .
2672221 8/1992 (FR) .

* cited by examiner

*Primary Examiner*—Kevin Lee
(74) *Attorney, Agent, or Firm*—Volpe and Koenig, P.C.

(57) ABSTRACT

A gas regulator/valve device particularly for use in emergency escape breathing apparatus, and comprising a T-shaped regulator piston which is movable in a stepped bore and has a nylon seat for closing a jet which receives the input (high pressure) gas. Movement of the piston by the input gas from a cylinder (not shown) is balanced by a spring. An annular groove is located in the narrow section of the bore on the remote side from the input gas pressure of an O-ring seal. As cylinder gas is used up, the piston moves upwards and eventually will expose the groove to the input gas. Thereupon, gas flows through passages and actuates a whistle or a pressure transducer. A valve assembly for gas regulators is also described. This comprises a piston member which is releasable by means of a pin to move upwards, under pressure from the regulator output, so as to expose a passage which opens into the output port. The valve is intended to be difficult to close, having once been opened.

12 Claims, 2 Drawing Sheets

GAS REGULATOR/VALVE DEVICE

BACKGROUND OF THE INVENTION

This invention relates to a gas regulator/valve device, particularly for use with breathing apparatus.

Known breathing apparatus generally comprises a source of breathable gas, such as a cylinder of compressed air, some form of hood or mask which is placed over the user's face or head and a tube connecting the two to supply gas from the source to the hood or mask. Generally speaking, the source of gas will be under a higher pressure than is necessary for supply to the user, and a regulator is used at the output of the gas source to reduce the pressure from that of the cylinder to that required by the user. Finally some form of valve is used to allow the supply to be turned on and off.

As the gas cylinder empties, the high pressure within the cylinder gradually falls until the pressure within the cylinder is no greater than the output pressure from the regulator. At this point, the cylinder can be considered to be virtually empty, and requires charging. In certain applications, it is useful to provide a warning to the user that the cylinder is near-empty, or to initiate some automatic process for charging cylinders. For example in emergency escape breathing apparatus, the user has a very limited supply of gas, usually from just a single cylinder, so there is no question of changing the cylinder and carrying on. Rather, the purpose of such equipment is to allow the user, after donning the equipment, to escape to safety from a dangerous situation. In such circumstances, it may be vital to know that the cylinder is running out.

It is known, in these circumstances, to provide an audible warning, this typically being in the form of a whistle actuated by the gas supply. Such whistles are generally connected to the cylinder side of the regulator and thus monitor the high cylinder pressure. Means are provided, within the whistle body, for detecting when the cylinder pressure falls to a predetermined level, at which point a valve is opened to actuate the whistle by means of the remaining gas pressure. Such whistles are complicated and expensive.

Known regulators comprise a piston which is movable within a cylindrical bore and controls flow through an orifice at the output from the cylinder to regulate the supply from the cylinder.

SUMMARY

According to a first aspect of the present invention, means are provided for monitoring the movement of said piston and providing an output when the piston reaches a predetermined position within the cylindrical bore, said position being indicative that the source of gas is empty or near-empty.

In a regulator utilising a piston, such as described above, the regulated output pressure is generally set by means of a spring which acts on the piston. It is a characteristic of such regulators that, as the pressure of the source gradually falls, so the piston slowly moves away from an arbitrary datum position, thus allowing the aforesaid valve to open wider and wider as the pressure falls. This movement is slight during the initial stages of discharging the gas source but, as the pressure of the gas source falls to a level approaching that of the regulated output of the valve, the movement markedly increases, causing an almost step movement in the movement of the piston. Once the piston has undertaken this step movement, regulation effectively ceases and the output pressure falls with the source pressure until the source is empty. The monitoring means of the present invention detects the step movement to enable a signal of some sort to be generated to indicate that the pressure of the source has fallen to substantially the same level as the regulated output pressure and that regulation has, in effect, ceased.

The monitoring means can take various forms, for example a magneto detector, a hall-effect sensor or a proximity sensor, all of which will provide an electric signal which can be used to initiate some automatic process or activate an alarm, or both. In an embodiment of the invention the piston itself acts as a valve member which, at a predetermined position of the piston, opens a valve to allow pressure to be applied to a transducer, which in turn generates an electrical signal in the manner described above, or direct to a pressure operated alarm, or whistle. For example, said monitoring means may comprise a port opening into the wall of the bore, and which is exposed to the input flow of gas when the piston reaches said predetermined position within the bore.

In certain applications, for example in emergency escape breathing equipment, it is necessary that the valve associated with the cylinder be difficult or impossible to close, once it has been opened. In emergency escape equipment, for example, it would clearly be undesirable to have the situation in which it was possible to use the cylinder for just short lengths of time and then leaving the equipment in a partially discharged state with no indication that the amount of gas remaining in the cylinder is less than would be expected.

In a second aspect of the present invention, such a valve is presented. In particular the invention provides a valve assembly for a regulator, said assembly comprising a cylindrical member which is slidably movable in a bore in a valve body, said bore extending from the outlet side of said regulator, and a valve for controlling the flow of gas from the output of said regulator, said cylindrical member being movable from a first position in which said valve is closed to a second position in which it is open, and the arrangement being such that the pressure of gas at the output to said regulator acts on said cylindrical member in such a way as to bias said member towards said second position and wherein means are provided for locking the cylindrical member in said first position against said bias.

The valve is operated by releasing the locking means, thus allowing the cylindrical member to move under the pressure of gas, thus opening the valve.

Subsequent closure of the valve can only be achieved by moving the cylindrical member back to the first position against the pressure of gas at the regulator output and re-applying the latching means.

The locking means may cheaply and conveniently take the form of a pin which extends across the aforesaid bore and prevents passage of the cylindrical member. Because of the bias felt by the cylindrical member and transferred to the pin, the pin will maintain its position without falling out. When the gas is needed, the pin can be pulled out, thus allowing the cylindrical member to move to the second position, thus opening the valve and allowing the regulator to start taking gas from the source.

In an emergency escape breathing apparatus, or similar application, the pin, or other latching means, can be automatically actuated by some external action such as the opening of the bag containing the equipment. A short length of cord attached at one end to the pin and at the other end to the lid of the bag can be arranged so that, as the lid is opened, the pin is automatically rewound, thus switching on the gas supply.

BRIEF DESCRIPTION OF THE DRAWINGS

In order that the invention may be better understood, an embodiment thereof will now be described by way of example only and with reference to the accompanying drawings in which.

DETAILED DESCRIPTION OF THE PREFERRED EMBODIMENT

Figure 1:
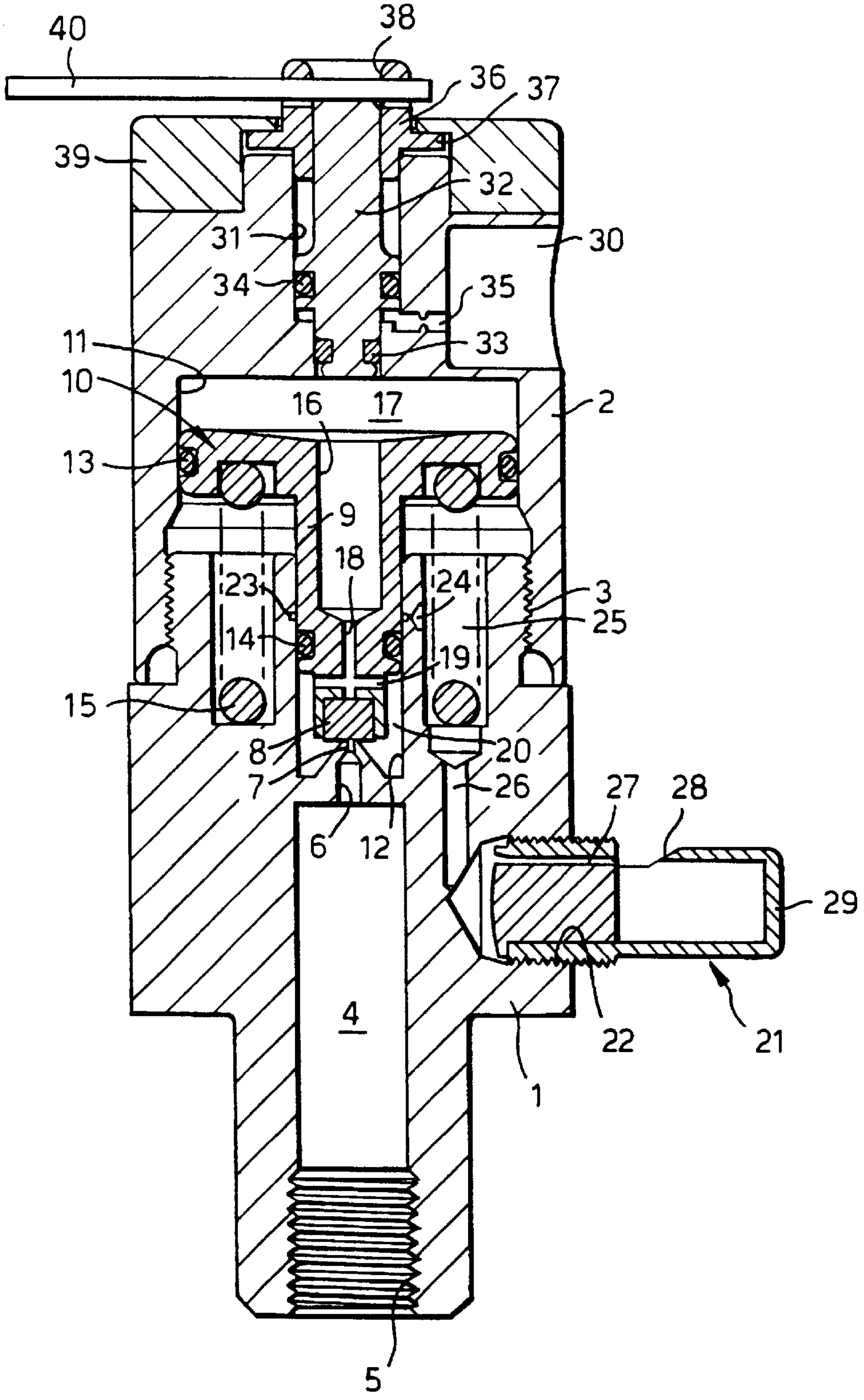
FIG. 1 is a sectional view of a regulator/valve device according to the invention.

Referring to FIG. 1 the regulator/valve device of the invention comprises a two-part housing comprising a body portion 1 and a head portion 2 which are generally cylindrical in shape and joined by a threaded connection 3.

The body portion 1 is formed with an axial bore 4 which is threaded at 5 and forms a standard connection for a gas cylinder (not shown) forming a source of pressurised gas. The internal end of bore 4 is narrowed at 6 and terminates in a jet 7. The jet is normally closed by a seat 8 of plastics material such as nylon which is fitted at the bottom end of the stem 9 of a T-shaped piston 10. The piston 10 is movable within a stepped bore having a wider section 11 formed axially in the head portion 2 and a narrow section 12 formed axially in the body portion 1. O-ring seals 13,14 are used to seal the head and stem of the piston 10 against the sections 11,12 respectively of the stepped bore. An axially-mounted compression spring 15 acts between the body portion 1 and the underside of the head of piston 10 and biases the piston in the upwards direction.

The piston 10 is formed with an axial bore 16 extending from the low pressure chamber 17 towards and into the stem 9 of the piston. The bore narrows at 18 and ends in a T-junction with a bore 19 which extends across the stem 9, opening at both ends into the intermediate chamber 20.

Operation of the regulator is conventional and will be understood without detailed explanation by those skilled in the art. Gas at high pressure, typically 200 bar, is supplied from the cylinder into the bore 4 and passes via the jet 7 into the intermediate chamber 20 and thence via bores 19 and 16 to the low pressure chamber 17 where it acts on the top surface of the head of piston 10 to tend to push the piston 10 downwards against the action of spring 15, at the same time tending to cause the seat 8 to close off the nozzle 7. During normal use of the regulator, when gas is being withdrawn from the low pressure chamber 17, the forces on piston 10 reach a balance condition in which the low pressure chamber is maintained at a substantially constant pressure, typically 10 bar.

Figure 2:
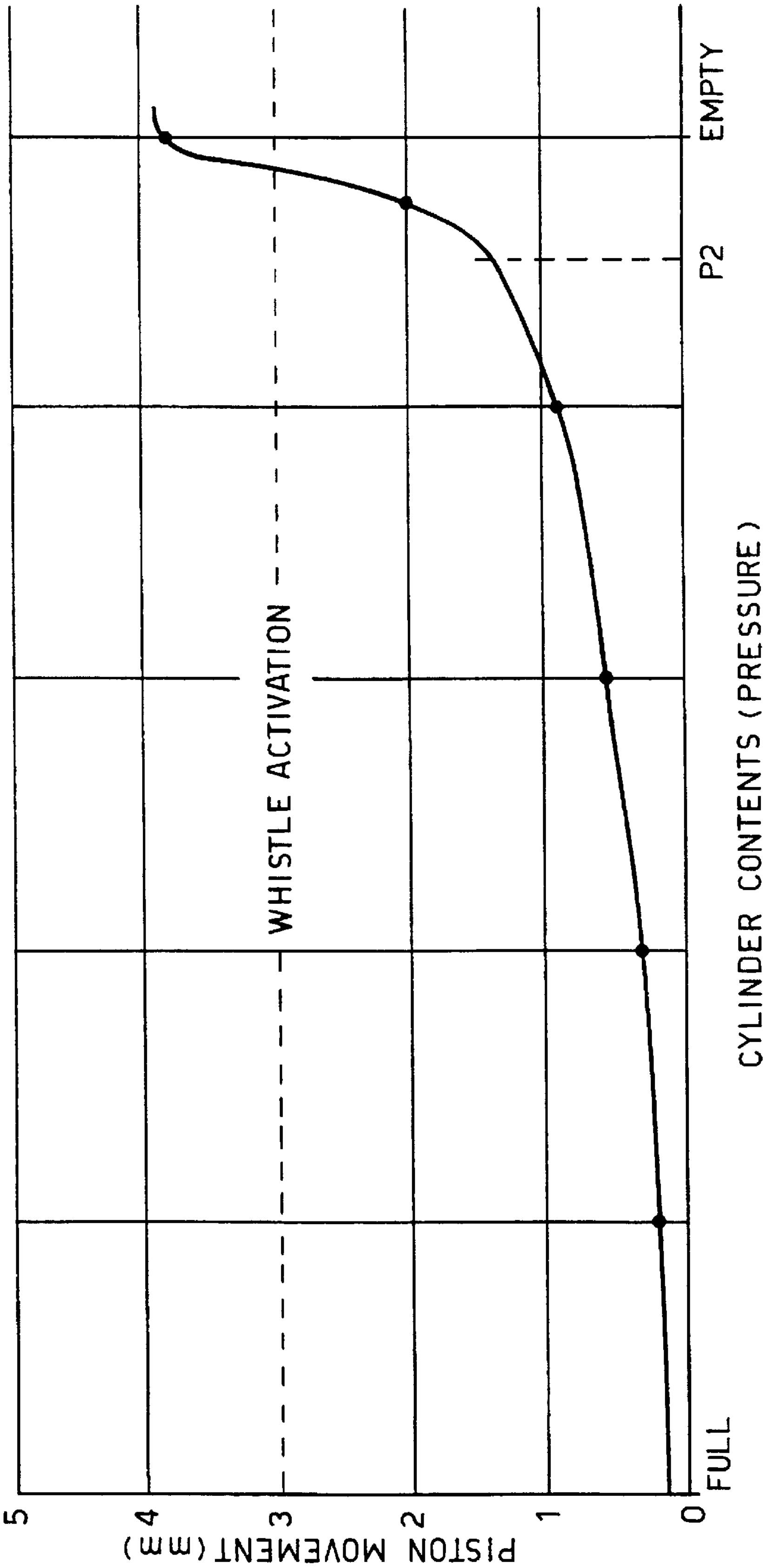
FIG. 2 is a graph of piston movement against cylinder pressure when the device is delivering a near-constant flow.

FIG. 2 is a graph of the upwards axial movement of piston 10 with respect to an arbitrary datum as the cylinder empties. It will be seen that the initial upwards movement as the cylinder empties is quite small. However, as the pressure remaining within the cylinder approaches the regulator output pressure, indicated in FIG. 2 as P2, the motion of the piston 10 with cylinder pressure reduction accelerates, forming quite a steep step, before the cylinder finally becomes empty.

This step motion of the piston 10 is used to actuate a valve which supplies air to a whistle 21 which is fitted in a lateral bore 22 of the body portion 1. The valve is formed by an annular groove 23 formed in the surface of the narrow section 12 of the stepped bore from which a lateral passage 24 extends into the annular spring cavity 25. The bottom of the cavity 25 is connected to the inner end of bore 22 by a passage 26. The groove 23 is positioned sufficiently high up the narrow section 12 of the stepped bore that, during normal operation of the regulator, it lies on the remote side of seal 14 and is thus at ambient pressure. However, when the cylinder pressure approaches the normal regulated output pressure, the piston moves upwardly, in the manner described above with reference to FIG. 2, so that the groove 23 eventually comes into communication with the chamber 20. As this occurs, gas passes through passage 24 into cavity 25 and thence via passage 26 to bore 22 where it is available to actuate the whistle 21 or a pressure transducer (not shown) which may alternatively be fitted in the bore 22. The whistle operates by flow of gas along a passage 27 across an edge 28 of the whistle body 29 to produce the required warning sound.

Low pressure gas exits from the chamber 17 via valve to an output port 30. The valve comprises a stepped axial bore 31 in which is slidable a cylindrical piston member 32. The piston member 32 is likewise stepped, and its lower, narrower, portion is sealed against the narrower portion of the bore 31 by means of an O-ring seal 33. The cylinder member also has a wider central portion which slides within the wider portion of the bore 31 and is sealed therewith by means of an O-ring seal 34. A lateral passage 35 extends off from the bore 31 and opens in the output port 30. An annular collar 36 is rotatably mounted at the top end of the bore 31 and has a flange 37 to limit its movement. The central aperture 38 of collar 36 is sized to receive the top end of the piston member 32 with a sliding fit. The collar is retained in place by means of a cap 39 fitted on the head portion 2 of the housing but is free to rotate with respect to the housing. A pin 40 extends laterally across the control aperture 38.

The valve is illustrated in FIG. 1 in its off position. In this position, gas in chamber 17 is unable to leave the chamber due to the fact that the bore 31 is blocked by the piston member 32. If the inlet connection 5 is attached to a source of pressurised gas, the regulator commences to operate, in the manner described above, until the pressure in chamber 17 forces the piston 10 downwards with sufficient pressure to close off the nozzle 7. Thus, no further gas can flow, and the cylinder is effectively shut off. The pressure within chamber 17 biases the piston member 32 in the upwards direction along the bore 31, but any movement is limited by the abutment of the piston member 32 against the pin 40.

To operate the valve, the pin 40 is removed, which allows the piston member 32 to move upwards along the bore 31 until its wider central portion buts up against the collar 36. By this point, the O-ring seal 33 has moved past the entrance to passage 35, thus allowing gas to pass from the chamber 17 via the bore 31 and passage 35 to the output port 30.

For ease of operation, the pin 40 may be adjusted in shape to suit the circumstances of operation. It may, for example, be formed with a ring pull. In the particular application of an emergency escape breathing apparatus, the pin may be provided with means for attaching one end of a cord, the other end of which is attached to the lid of a bag containing the gas cylinder. The arrangement is such that, as the lid is removed, or hinged away from the rest of the bag, the cord is pulled to automatically remove the pin to thus start the supply of gas. As already mentioned, the collar 36, and hence the pin 40, are rotatable about the body so that the pin can rapidly be rotated to a favoured direction for easy removal.

The valve is deliberately made easy to open, but much less easy to close. Closing the valve while pressure remains in chamber 17 involves pushing the piston member 32 back down the bore 31 against the pressure of the gas and then slipping pin 40 back into place once clearance for it has been attained. Also, because of the stepped bore/piston arrangement, the force required to close the valve is greater than that required to open it since, in the case of closure, the gas pressure in chamber 17 is acting on the wider central portion of the piston member 32.

What is claimed is:

1. A gas regulator comprising a piston movable in a cylindrical bore in order to control an input flow of gas from a gas source, said regulator being characterized in that means are provided for monitoring movement of the piston and providing an output when the piston reaches a predetermined position within the bore, said position being indicative that the source of gas is empty or near-empty, wherein said monitoring means comprises a port opening into the wall of the bore, and which is exposed to the input flow of gas when the piston reaches said predetermined position within the bore.

2. A gas regulator as claimed in claim 1 wherein the output pressure of gas is set by a spring which acts on the piston, the arrangement being such that the input flow of gas tends to move the piston in one direction along the bore whereas the spring tends to bias the piston in the opposite direction in the bore.

3. A gas regulator as claimed in claim 1 wherein said port is normally exposed to ambient pressure.

4. A gas regulator as claimed in claim 1 wherein the piston is provided with a seal acting against said bore, and wherein said port is normally positioned on the remote side of said seal from the input flow of gas.

5. A gas regulator as claimed in claim 4 wherein said piston is provided with a further seal similar to and longitudinally spaced from the first-mentioned seal and wherein said port is normally positioned between said seals and is thus isolated both from the input flow of gas and the regulated output of gas.

6. A gas regulator as claimed in claim 5 wherein that part of the bore situated between the two seals is connected to ambient pressure.

7. A gas regulator as claimed in claim 1 wherein said port is formed as an annular groove formed in the surface of the bore, and wherein a passage leads from said groove to activate a transducer providing said output.

8. A gas regulator as claimed in claim 7 wherein said transducer takes the form of a pressure operated transducer which generates an electrical signal or sounds a warning.

9. A gas regulator as claimed in claim 8 wherein said transducer comprises a whistle.

10. A gas regulator comprising a piston movable in a cylindrical bore in order to control flow of gas from a gas source through the bore to an outlet port, said regulator being characterized in that an output in the bore is provided such that when the piston reaches a predetermined position within the bore, said output becomes in communication with the flow of gas through the bore, said position being indicative that the source of gas is empty or near-empty.

11. A gas regulator comprising a piston movable in a cylindrical bore in order to control an input flow of gas from a gas source, the output pressure of gas being set by a spring which acts on the piston to control the flow of gas through an orifice in such a way that the pressure of the input flow of gas acts in opposition to the force of the spring to achieve a balance condition in which the flow of gas through the orifice is controlled to regulate the output pressure of gas, said regulator being characterized in that means are provided for monitoring location of the piston and providing an output when the piston reaches a predetermined position within the bore, said position being indicative that the source of gas is empty or near-empty.

12. A gas regulator as claimed in claim 11 wherein the input flow of gas tends to move the piston in one direction along the bore whereas the spring tends to bias the piston in the opposite direction in the bore.

* * * * *